Jan. 13, 1942. E. A. CORBIN. JR 2,270,037
REVERSIBLE VALVE
Filed Dec. 11, 1939 2 Sheets-Sheet 1

ELBERT A. CORBIN JR.
INVENTOR.

BY *Louis Necho*
ATTORNEY.

Jan. 13, 1942.  E. A. CORBIN, JR  2,270,037
REVERSIBLE VALVE
Filed Dec. 11, 1939  2 Sheets-Sheet 2
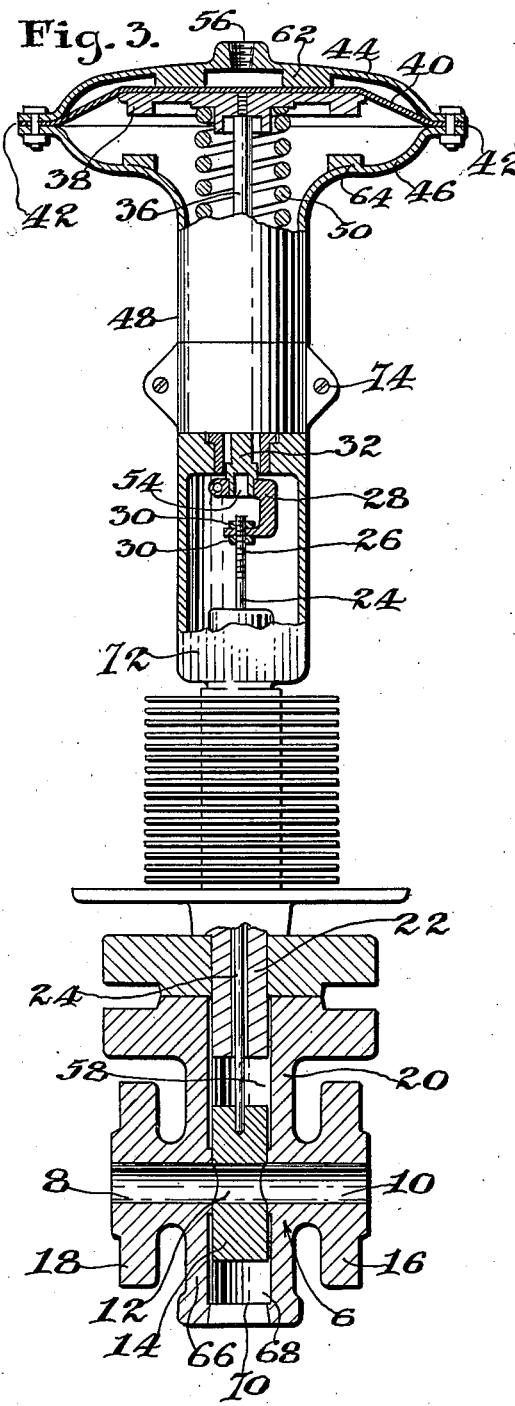
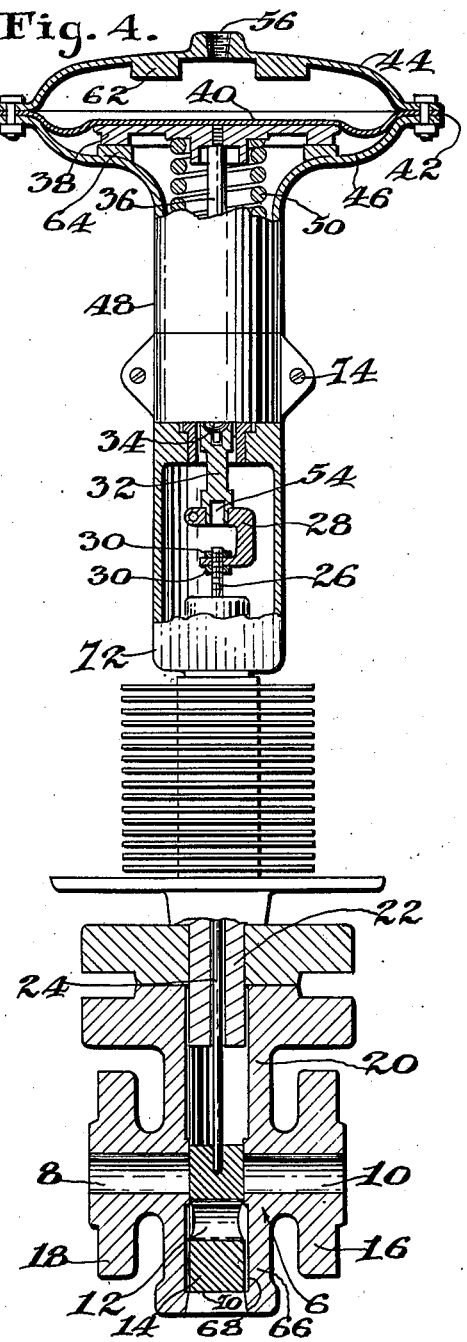
ELBERT A. CORBIN JR.
INVENTOR.
BY *Louis T. Necho*
ATTORNEY.

Patented Jan. 13, 1942

2,270,037

UNITED STATES PATENT OFFICE 2,270,037

REVERSIBLE VALVE

Elbert A. Corbin, Jr., Lansdowne, Pa., assignor of one-half to William C. Biddle, Lansdowne, Pa.

Application December 11, 1939, Serial No. 308,536

1 Claim. (Cl. 137—153)

My invention relates to a new and useful reversible valve and more particularly to the type of valve which is used in connection with a piping system such as the piping system employed in the oil industry and which now, in practice, employs valves which are so constructed as to be capable of being opened by spring pressure and closed by air or hydraulic pressure or the like and vice versa. However, such valves now known and used can only be reversed by completely disconnecting the valve and physically reversing it and its connections, all of which necessitates cutting off all the line, and interruption of service and operation, as well as auxiliary valves for stopping the flow on either side while the valve is being reversed.

It is therefore the object of my invention to produce a valve of this character which, once installed, can be closed by the spring or by the air pressure, the valve being reversible by means of an externally accessible adjustment which can be manipulated without any special skill, without the use of any special tools and in only a few seconds.

The full nature of my invention will be more clearly understood from the following specification and the accompanying drawings in which, Fig. 1 represents a vertical section of a reversible valve embodying my invention, the same being shown in the open position and so adjusted as to be opened by pressure and closed by a spring.

Fig. 3 represents a view similar to Fig. 1 showing the valve adjusted so as to be opened by the spring and to be closed by pressure, the valve being shown in the open position.

Fig. 4 represents a view similar to Fig. 3 showing the valve in the closed position.

Figure 1:
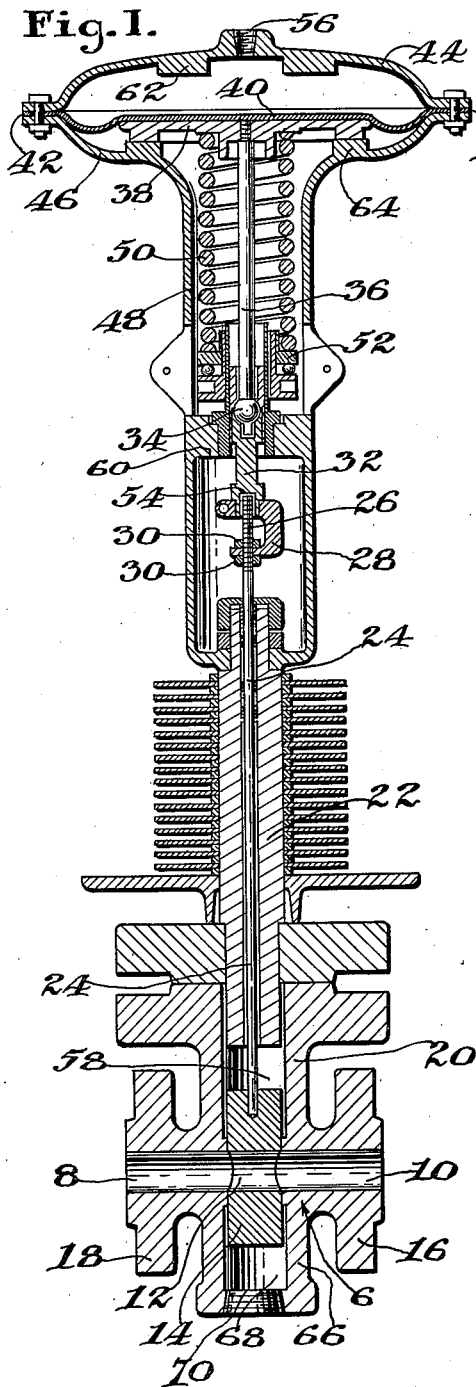

Referring to the drawings in which like reference characters indicate like parts, 6 designates a fitting having the openings 8 and 10 which may be used reversibly as inlets or outlets and which are adapted to intercommunicate through the port 12 formed in the valve plug 14. The fitting 6 is provided with the flanges 16 and 18 for connection to similar companion flanges on the pipes (not shown) to which the valve is to be applied. The fitting 6 is provided with an extension 20 which forms a guide or bearing for the sleeve 22 in which reciprocates the valve stem 24 which is secured at its bottom end to the valve plug 14. At its upper end the valve stem 24 is provided with the threaded portion 26 which is guided through vertical aligning apertures in the bracket 28, and which is also engaged by the nuts 30. The bracket 28 is carried by the link 32 which, through the ball bearing 34, is operatively connected to the stem 36. The stem 36 is secured at its upper end to the plate 38 on which rests the diaphragm 40, the periphery of the diaphragm being clamped as at 42 between the cover 44 and the dished extension 46 secured by or forming part of the sleeve 48. Within the sleeve 48 is the spring 50 the upper end of which bears against the plate 38 and the lower end of which bears against the stop collar 52. In the bottom of the link 32 is provided an elongated recess 54 which is adapted to receive the upper threaded portion 26 of the valve stem 24 when the valve is so adjusted.

Figure 2:
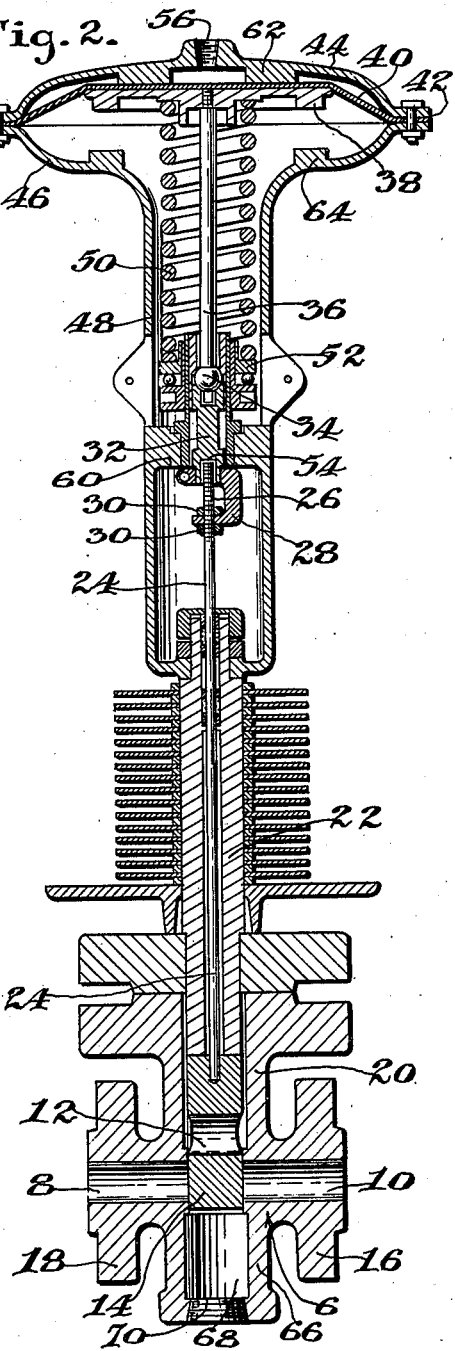
Fig. 2 represents a view similar to Fig. 1 showing the valve closed.

In Figs. 1 and 2 the valve has been adjusted so as to be opened by pressure against the diaphragm 40 and to be closed when the pressure against the diaphragm 40 is relieved by the action of the spring 50. In this position of the parts the nuts 30 are turned to raise the valve stem 24 until its upper end has reached the upper extreme of the recess 54 so that, when the pressure is applied on the diaphragm 40 and the stem 24 is depressed to its lowermost position, the port 12 in the valve plug 14 registers with the openings 8 and 10. When the pressure, which is introduced through the port 56, is exhausted, the parts will assume the position shown in Fig. 2 in which the expansion of the spring 50 lifts the valve stem and hence the valve plug 14 into their uppermost position in which the solid, lower portion of the valve plug 14 registers with the openings 8 and 10 and stops the flow therethrough. It will be noted that the bottom edge of the sleeve 22 forms a stop against which the upper edge of the valve plug 14 abuts when the spring 50 is expanded, and that the space 58, which is shown between the valve plug 14 and the sleeve 14 in Fig. 1, is equal to or slightly in excess of the width of the openings 8 and 10. It will also be noted that the bracket 28 in Fig. 1 is spaced from the bottom edge of the hub 60 and that, in the position of the parts as shown in Fig. 2, the bracket 28 abuts against the hub 60 so that the hub 60 and the lower edge of the sleeve or bushing 22 act as stops to limit the upward movement of the valve stem 24 in the valve plug 14. Also, the pendant bosses 62 of the cover 44 serve as further stops against which the plate 38 abuts when the valve is in the closed position shown in Fig. 2. The downward movement of the valve stem 24 and the valve plug 14 is limited by the abutment of the plate 38 against the bosses 64 formed in the dished extension 46 as clearly seen in Fig. 1. In order to render the valve reversible, I also provide the extension 66 at the bottom of the fitting 6 so as to form a chamber 68 below the lower edge of the valve plug 14, the space or chamber 68 being equal to the space or chamber 58 above the valve plug 14. In the bottom of the chamber 68 is provided any suitable stop 70 to limit the downward movement of the valve plug 14.

Referring now to Figs. 3 and 4 it will be seen that the nuts 30 have been manipulated so as to depress the valve stem 24 in the valve plug 14 so that, when there is no pressure on the diaphragm 40 and the spring 50 is expanded, the port 12 in the valve plug 14 registers with the openings 8 and 10. In this construction the bracket 26 is, in the absence of pressure on the diaphragm 40, abutting against the hub 60, and the plate 30 is abutting against the bosses 62 on the underside of the cover 44. When it is desired to close the valve, when it is so adjusted, pressure is admitted through the opening 56 to depress the diaphragm 40, the plate 30, the stem 36, the stem 24 and the valve plug 14 so that the upper portion of the valve plug 14 now registers with the openings 8 and 10 to stop the flow therethrough, all as shown in Fig. 4.

It will therefore be seen that by merely raising or lowering the valve stem 24 and valve plug 14 within the spaces provided for that purpose, and by merely manipulating the nuts 30 which are easily accessible by removing the corresponding section of the cover 72 which is secured in position by any suitable means at 74, the same valve construction can be reversed completely in its operation in that it can be opened by pressure on the diaphragm 40 as shown in Fig. 1 to be closed by the spring pressure as shown in Fig. 2, or to be maintained in the open position by the spring as shown in Fig. 3, or to be closed by pressure on the diaphragm as shown in Fig. 4.

Having thus described my invention, what I claim as new and desire to secure by Letters Patent is,

A valve construction of the character stated comprising a fitting having an elongated chamber formed therein and a through opening transversely intercepting said chamber, an elongated valve piston reciprocable in said chamber and having a transverse through opening therein, said opening and the body portions of said valve piston to either side thereof being adapted to be brought into or out of complete or partial registration with the opening in said fitting, a valve stem connected to said valve piston, an actuating arm, a spring operatively connected to said arm for constantly urging it in one direction, a pressure actuated diaphragm adapted to actuate said arm in the opposite direction, and a yoke having one limb thereof fixedly connected to said actuating arm and the other limb thereof adjustably connected to the juxtaposed end of said valve stem, the length of said chamber to either side of the transverse opening in said fitting and the range of adjustment between said yoke and said valve stem each being equal to at least one-half of the overall length of said valve piston.

ELBERT A. CORBIN, JR.